United States Patent Office 3,365,279
Patented Jan. 23, 1968

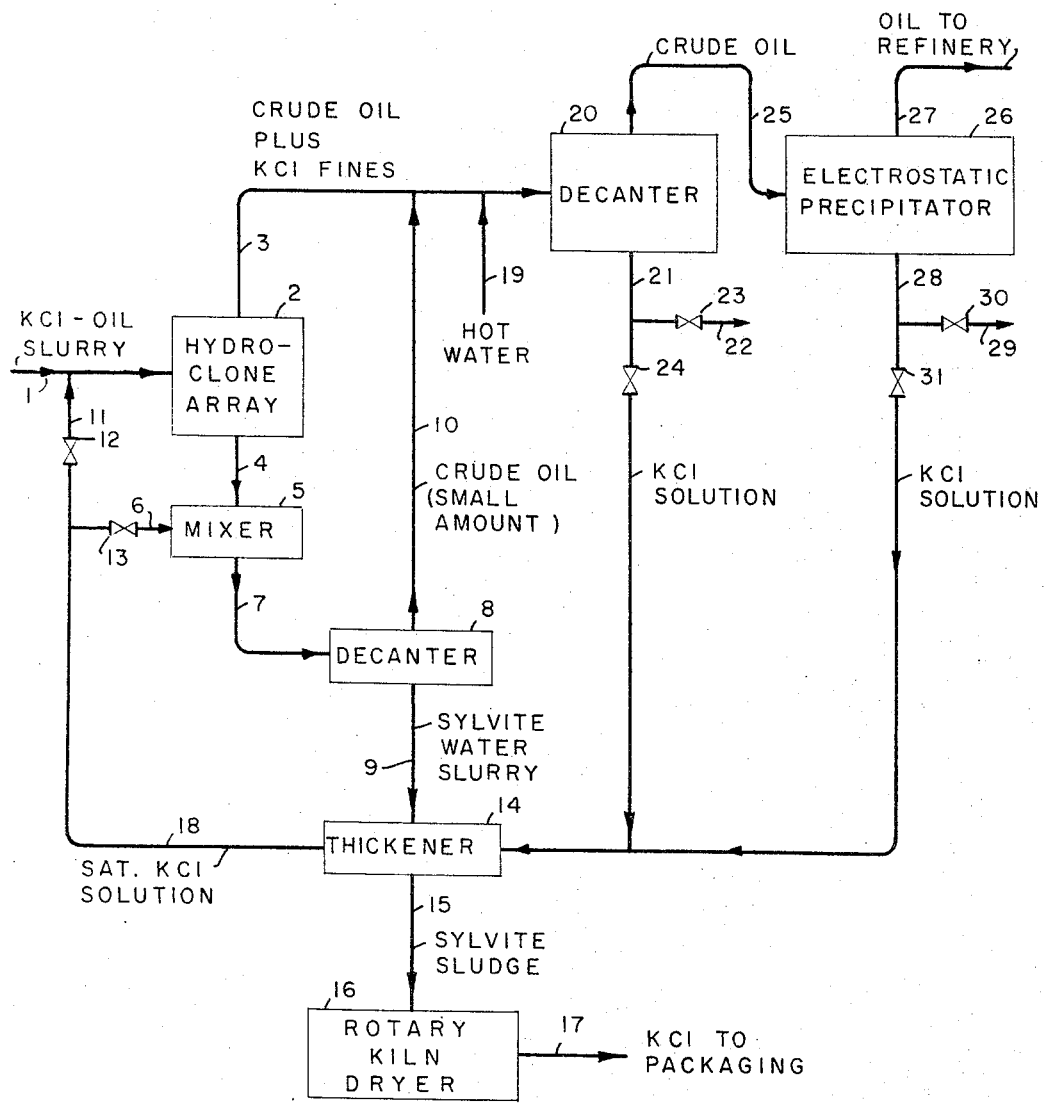

3,365,279
TRANSPORT OF WATER-SOLUBLE SOLIDS IN AN OIL CARRIER AND THEIR RECOVERY BY CONTACTING WITH A SATURATED BRINE
Stanley Marple, Jr., Houston, Tex., assignor to Shell Oil Company, New York, N.Y., a corporation of Delaware
Filed May 12, 1964, Ser. No. 366,870
11 Claims. (Cl. 23—312)

ABSTRACT OF THE DISCLOSURE

An improved method of transferring water-soluble particles slurried in oil and recovering said particles from the oil by contacting said slurry with an essentially saturated brine solution to effect phase transfer of the particles from the oil into the brine phase.

---

The invention relates to the recovery of water-soluble solids, such as inorganic minerals, e.g., potassium chloride, potash, potash salts, sodium chloride, soda ash, sodium sulphate, and phosphate rock, from their dispersion as finely divided particles in oil. The invention finds application, for example, in the separation of such solids from crude or refined oil after having been dispersed in such oil for transportation through a pipe line.

Water-soluble solid materials in granular form can be transported by dispersing them in oil and pumping the resulting slurry through a pipe line. When the particles have a tendency to settle or rise in the oil and insufficient turbulence can be maintained to hold them in suspension, the suspension may be aided by suitable expedients, such as the formation of an aqueous brine suspension of the particles and the emulsification of the brine suspension in the carrier oil (see U.S. patent to Cross, No. 2,610,900) or the addition of surfactants or the formation of porous agglomerates of the granules which may be bonded to each other by a small, film-forming amount of water which may itself contain a surfactant. At the delivery end of the pipe line, the material must be recovered from the oil. This has heretofore been effected by such techniques as settling, filtration, centrifuging or, when emulsions are used, emulsion-breaking followed by one of the other techniques.

Each of the mentioned recovery techniques has certain technological drawbacks. Settling is slow which requires large vessels, and in common with filtration and centrifuging, requires extensive washing of the separated material with solvents and the expenditure of large amounts of heat to vaporize the solvent. Heat and/or chemicals are used for emulsion breaking.

The present invention presents an improved technique for recovering dispersed water-soluble material from oil and is applicable to oil slurries of any of the types previously mentioned. Thereby, the recovery operation is simplified and made more economical. Further, the technique may be used to modify the properties of the recovered material.

According to the invention, the oil slurry is brought into intimate contact with a saturated brine, thereby causing the dispersed material from the oil slurry to enter the brine phase; the latter phase is thereafter separated from the oil, e.g., by settling or centrifuging, or flow through a hydrocyclone. The water-soluble solid material is then removed from the separated brine phase by thickening, settling, centrifuging, or filtration, or a combination of these.

The residual brine may, in continuous operations, be returned to the oil-contacting step for the treatment of additional oil slurry.

When the oil slurry is brought into contact with the brine, the latter preferentially wets the dispersed water-soluble material, which material passes into the brine phase and remains therein during separation of said phase from the oil. The brine may consist of water in which is dissolved the same material as that to be recovered from the oil slurry, although another water-soluble solute may be used. The brine is advantageously saturated so that the preferentially wetted material will not dissolve. The solid material recovered from the brine is substantially free from oil and either washing is not necessary or a light wash is sufficient. The recovered solid material is readily dried by heating. The material may be reconstituted into crystals of desired size if not in proper physical form.

The oil from which the brine was separated may in some cases contain small, usually trace amounts of crystals or brine droplets. When they are detrimental to the oil, they may be removed by any suitable technique, such as a water wash which is followed by setling, optionally after flow through a coalescing device and/or electrostatic precipitation.

The above-described phase-transfer method of removing the water-soluble material from oil is based on the observation that such dispersed material is preferentially wetted by water even though the water is a saturated brine. By using substantially saturated brine, the separated material remains in the solid state. This preferential wetting action is believed to be an ionization process and may be described as ionic attraction.

The invention is not limited to the treatment of slurries which contain dispersed particles of any particular size or range of sizes. However, it is most effective when applied to particles larger than 50 microns. Typically, the particles have diameters between 50 and 1000 microns and sizes up to 4000 and higher may be effectively recovered. Often fine particles are deliberately added to an oil slurry formed of larger particles to hinder settling of the latter. In such cases, the finest particles are not completely transferred to the brine phase and the oil is subjected to an after treatment such as washing with hot water; this may be followed by precipitation as noted above. The fine particles thus washed from the oil are in solution, forming a brine, and may therefore be added to the brine in the system. However, some or all of this solution may be discharged, as when the inventory of brine would otherwise become too large or when it contains impurities which are to be discharged.

It is desirable to cause as little oil as possible to be carried over into the brine phase. To this purpose the brine may be heated to above ambient temperature, for example 150° to 200° F.; higher temperatures, such as 300° F., may be used but require pressurized equipment. However, heating is feasible only with certain water-soluble materials. Thus, it was found that in some instances, in which impurities were present in the oil-slurried material, contacting with hot brine resulted in the formation in the oil phase of material which is sometimes difficult to remove. Careful control of mixing conditions alleviates or completely eliminates the difficulty. When heated brine is used, it need not be saturated at the elevated temperature, it being sufficient that it be saturated at the temperature which the material is recovered from the brine. As a specific example, brine saturated at 85° F. may be heated to 200° F. and brought into contact with the oil to reduce the amount of oil carried into the brine and thereafter settled a 85° F.

When the oil slurry contains agglomerates of particles, such agglomerates are highly porous and the pores are filled with oil. It is not desirable to transfer the agglomerates as such into the brine, but to disrupt them. This is effected by agitation during the contacting step, such as stirring or turbulence induced by flow through hydrocyclones.

According to a variant, the initial oil slurry is concentrated with respect to the dispersed particles, as by flow through one or a series of hydrocyclones or a centrifuge, and the above-described treatment is applied to the concentrated slurry. Such preliminary concentration usually results in the separation with the clearer oil fraction of minor amounts of the particles, particularly the finer particles. This fraction is then treated for the removal of the particles, as by a water-wash as previously mentioned.

The invention will be further described with reference to the accompanying drawing forming a part of this specification, the single view of which is a flow diagram of an illustrative embodiment.

Referring to the drawing, the slurry to be treated, such as a carrier of crude oil containing dispersed granules of sylvite (technical potassium chloride) discharged from a pipe line is admitted via a line 1 to a preliminary separator, such as a hydrocyclone array 2, wherein a part of the crude oil, containing only minor amounts of sylvite, is separated as the lighter phase and discharged at 3 and from which the concentrated slurry is discharged at 4. The latter is mixed intimately in a mixing zone 5 with saturated brine supplied by a line 6. This causes the sylvite to enter the brine phase. The mixing zone may include stirrers, when desirable for breaking up agglomerates, but may be a simple pipe mixer, wherein contact is achieved by turbulent flow through a pipe. The mixture flows via a line 7 to a separator, such as a continuous decanter 8, wherein the brine phase is separated by settling from the oil phase, these phases being discharged at 9 and 10, respectively. The size of the oil phase will be determined by the amount of oil separated through the line 3. It is evident that the preliminary separator 2 is optional. According to an optional feature, a part or all of the brine is commingled with the incoming oil slurry via a line 11, by control of the valves 12 and 13, to facilitate concentration in the hydrocyclone 2.

The brine phase, containing solid sylvite, is passed to a separator, such as thickener 14, wherein the solids settle and from which they are discharged at 15 for drying in a device 16, such as a rotary kiln. The dried sylvite is discharged at 17. The clarified brine is discharged from the separator 14 at 18 and returned to the mixer 5 and/or the hydrocyclone 2. It may be noted that most of the oil—often 1 to 15% based on the entering oil—carried into the separator 14 is returned via the line 18 and does not contaminate the recovered salt.

The oil phase in the line 3 will often contain sylvite, especially when the slurry contains both fine and large particles. This stream is combined with the oil in the line 10 and commingled with water, preferably heated to 150°–250° F., admitted at 19, and passed to a separator 20, wherein residual sylvite is settled as an aqueous phase. This phase is drawn off at 21 and may be discharged at 22 through valve 23, or through valve 24 to the separator 14. The oil from the separator is discharged at 25 and, when it still contains impurities, may be passed to an after-treater such as an electrostatic precipitator 26, from which the purified oil is discharged at 27. The precipitated impurities are drawn off at 28 and may be discharged at 29 through valve 30. When these impurities consist principally of water and material which is to be included in the dried product, they are passed through valve 31 to the separator 14.

*Example I*

A slurry of crude oil contained 55.9% by weight of crude potassium chloride having particle sizes distributed as follows:

| U.S. Sieve No. | Sieve Opening, mm. | Particles, percent w. |
|---|---|---|
| Retained on 30 | 0.59 | 0 |
| 40 | 0.42 | 18.5 |
| 50 | 0.297 | 26.2 |
| 100 | 0.149 | 11.9 |
| 200 | 0.074 | 2.4 |
| Passed 325 | | 41.0 |

This slurry was intimately mixed at 85° F. with 2.5 times its volume of a saturated brine of KCl, and the brine phase was settled from the oil. The oil phase contained 89% of the original oil and contained brown suspended material which was filterable and consisted of a material amounting to about 0.6% w. of the KCl initially in the slurry. The brine contained the transferred KCl, which was recovered by settling. After drying by heat, it was found to amount to 99.5% w. of the original salt in the slurry.

*Example II*

The operations described in Example I were repeated with the difference that the brine was brought into contact with the oil slurry at 200° F. (at which it was no longer saturated). The oil phase contained 98% of the original oil, but contained a small amount of suspended material. The brine was cooled to 85° before separating the transferred KCl, which, after drying, contained substantially all the original salt in the slurry.

Although the invention was particularly described for use in connection with alkali metal salts, it is not so limited.

I claim as my invention:

1. The method of recovering water-soluble materials from their slurry dispersed in substantial amounts as finely dispersed particles in oil which comprises the steps of:
    (a) adding potassium chloride particles to an oil carrying agent in substantial amounts to form a slurry,
    (b) bringing said slurry into intimate contact with an aqueous brine saturated with respect to said water-soluble materials and thereby causing the transfer of said particles from the oil phase into the brine phase, and
    (c) separating the saturated brine phase, containing said transferred particles, from the oil phase.

2. Method as defined in claim 1 wherein said aqueous brine is saturated at ambient temperature.

3. Method as defined in claim 2 wherein said brine is brought into contact with and separated from the oil phase at a temperature between 150 and 250° F.

4. In combination with the method defined in claim 1, the step of separating the particles from the brine phase after separation of the latter from the oil phase.

5. The method defined in claim 1 which includes the preliminary step of concentrating the oil slurry by separating therefrom oil containing a lower concentration of particles by centrifugal separation means.

6. The method defined in claim 1 wherein said water-soluble material is an alkali metal salt.

7. In combination with the steps defined in claim 11, the steps of:
    (a) washing the separated oil phase with water to remove therefrom residual inorganic material as an aqueous solution, and
    (b) returning said aqueous solution to the brine.

8. The method of claim 11 wherein the hot brine is contacted with the oil slurry at a temperature between 150 to 300° F.

9. The method of claim 1 wherein the water-soluble material is potash.

10. The method of claim 11 wherein the water-soluble material is sylvite.

11. The method in claim 1 wherein the aqueous brine is contacted with the oil slurry at between 150 to 250° F., said aqueous brine being saturated with potassium chloride at said temperature of contacting.

References Cited

UNITED STATES PATENTS

| | | | |
|---|---|---|---|
| 1,984,903 | 12/1934 | Wagner | 208—251 |
| 2,610,900 | 9/1952 | Cross | 302—66 |
| 2,728,714 | 12/1955 | Winkler | 208—251 X |
| 2,785,120 | 3/1957 | Metcalf | 208—251 X |
| 2,789,083 | 4/1957 | Hardy | 208—251 X |
| 3,206,256 | 9/1965 | Scott | 302—66 |

FOREIGN PATENTS

| | | |
|---|---|---|
| 547,232 | 8/1957 | Canada. |
| 503,272 | 12/1954 | Italy. |

OTHER REFERENCES

Wall et al.: Reduction of Fireside Deposits in Marine Boiler, October 1960, Atlantic Refining Co., Philadelphia, Pa., pp. 1, 3, 10 to 13.

NORMAN YUDKOFF, *Primary Examiner.*

S. J. EMERY, *Assistant Examiner.*